US006114023A

United States Patent [19]

Schwarz et al.

[11] Patent Number: 6,114,023

[45] Date of Patent: Sep. 5, 2000

[54] PRINTABLE MICROPOROUS MATERIAL

[75] Inventors: Richard A. Schwarz, Akron, Ohio; Raymond R. Ondeck, McMurray, Pa.

[73] Assignee: PPG Industries Ohio, Inc., Cleveland, Ohio

[21] Appl. No.: 09/119,245

[22] Filed: Jul. 20, 1998

[51] Int. Cl.[7] .................................................. B32B 3/26

[52] U.S. Cl. ................................ 428/315.5; 428/317.9

[58] Field of Search .............................. 428/315.5, 317.9

[56] References Cited

U.S. PATENT DOCUMENTS

| | | | |
|---|---|---|---|
| 2,657,149 | 10/1953 | Iler | 106/308 |
| 2,772,322 | 11/1956 | Witt et al. | 136/146 |
| 2,940,830 | 6/1960 | Thornhill | 23/182 |
| 3,637,415 | 1/1972 | Civardi | 117/62 |
| 3,696,061 | 10/1972 | Selsor et al. | 260/2.5 M |
| 3,716,397 | 2/1973 | Civardi et al. | 117/77 |
| 3,862,030 | 1/1975 | Goldberg | 210/24 |
| 4,648,417 | 3/1987 | Johnson et al. | 134/105 |
| 4,681,750 | 7/1987 | Johnson et al. | 423/339 |
| 4,734,229 | 3/1988 | Johnson et al. | 264/40.6 |
| 4,833,172 | 5/1989 | Schwarz et al. | 521/62 |
| 4,861,644 | 8/1989 | Young et al. | 428/195 |
| 4,877,679 | 10/1989 | Leatherman et al. | 428/224 |
| 4,892,779 | 1/1990 | Leatherman et al. | 428/220 |
| 4,927,802 | 5/1990 | Leatherman | 503/214 |
| 4,937,115 | 6/1990 | Leatherman | 428/36.4 |
| 4,957,787 | 9/1990 | Reinhardt et al. | 428/24 |
| 4,959,208 | 9/1990 | Chakrabarti et al. | 424/78 |
| 5,032,450 | 7/1991 | Rechlicz et al. | 428/196 |
| 5,035,886 | 7/1991 | Charkrabarti et al. | 424/78 |
| 5,047,283 | 9/1991 | Leatherman et al. | 428/209 |
| 5,071,645 | 12/1991 | Johnson et al. | 424/486 |
| 5,094,829 | 3/1992 | Krivak et al. | 423/339 |
| 5,114,438 | 5/1992 | Leatherman et al. | 51/296 |
| 5,196,262 | 3/1993 | Schwarz et al. | 428/315.5 |
| 5,243,655 | 9/1993 | Wang | 380/51 |
| 5,304,786 | 4/1994 | Pavlidis et al. | 235/462 |
| 5,326,391 | 7/1994 | Anderson et al. | 106/409 |
| 5,352,513 | 10/1994 | Mrozinski et al. | 428/315.5 |
| 5,393,965 | 2/1995 | Bravman et al. | 235/383 |
| 5,401,944 | 3/1995 | Bravman et al. | 235/375 |
| 5,489,158 | 2/1996 | Wang et al. | 400/103 |
| 5,504,322 | 4/1996 | Pavlidis et al. | 235/494 |
| 5,541,394 | 7/1996 | Kouchi et al. | 235/375 |
| 5,583,171 | 12/1996 | Schwarz et al. | 524/261 |
| 5,596,652 | 1/1997 | Piatek et al. | 382/115 |
| 5,605,750 | 2/1997 | Romano et al. | 428/304.4 |
| 5,646,389 | 7/1997 | Bravman et al. | 235/385 |
| 5,689,101 | 11/1997 | Kikushi et al. | 235/383 |
| 5,690,949 | 11/1997 | Weimer et al. | 424/402 |

OTHER PUBLICATIONS

B. Moore, "New technologies make their mark on business, Source marking doesn't just mean bar coding anymore", *Automatic I.D. News,* Jun. 1998, pp. 40–41.

American Standard Test Method C 819–77.

American Standard Test Method D 97–87.

American Standard Test Method D 1238–90b.

American Standard Test Method D 1248–84 (Reapproved 1989).

American Standard Test Method D 2226–87.

*Primary Examiner*—Blaine Copenheaver
*Attorney, Agent, or Firm*—James R. Franks; Irwin M. Stein

[57] ABSTRACT

Described is a printable microporous material exhibiting enhanced readability of one or more images, e.g., printed indicia, patterns, and designs, applied thereupon. The printable microporous material of the present invention comprises: a matrix of substantially water-insoluble thermoplastic organic polymer, e.g., ultrahigh molecular weight polyethylene, finely divided, substantially water-insoluble non-color producing particulate filler, e.g., precipitated silica, a network of interconnecting pores communicating substantially throughout the material, and an amount of blue colorant sufficient to improve the readability of printing, e.g., two-dimensional bar codes, present thereon.

23 Claims, No Drawings

PRINTABLE MICROPOROUS MATERIAL

DESCRIPTION OF THE INVENTION

Microporous materials comprising thermoplastic organic polymer, particulate filler, a network of interconnecting pores, and blue colorant are described. The blue colorant is either topically applied to or distributed throughout the microporous material. The present invention also relates to microporous compositions having printing thereon in the form of at least one of indicia, patterns, and designs, the readability of which is improved by the presence of the blue colorant.

Microporous materials comprising a matrix of substantially water-insoluble thermoplastic organic polymer; substantially water-insoluble particulate filler; and an interconnecting network of pores are known and have many desirable properties. In particular, such microporous materials are particularly useful as printing substrates, for example, as described in U.S. Pat. No. 4,861,644.

The appearance to the observer of the printed image, and in particular intricate printed images, over the surface of such known microporous materials can be less than desirable. Intricate printing applications include, for example, fine alpha-numeric printing, and two-dimensional (2-D) bar codes. Very fine alpha-numeric print, e.g., less than a font size of 6, can have poor machine readability, e.g., by a digital scanner. The machine readability of 2-D bar codes applied to such substrates can be degraded resulting in, for example, data transfer errors during the bar code scanning process.

It would be desirable to develop an improved microporous material that exhibits enhanced appearance of various printed images applied thereto. In particular, it would be desirable that intricate printing, e.g., 2-D bar codes, applied to such improved microporous materials, have enhanced appearance, and in particular, enhanced machine readability.

U.S. Pat. Nos. 4,833,172, 4,861,644, 4,877,679, 4,892,779, 4,972,802, 4,937,115, 4,957,787, 4,959,208, 5,032,450, 5,035,886, 5,047,283, 5,071,645, 5,114,438, 5,196,262, 5,326,391 and 5,583,171 describe microporous materials that may optionally have present therein small amounts, usually less than 15 percent by weight, of other materials including, for example, dyes and pigments. These cited patents do not disclose microporous materials containing blue colorants.

U.S. Pat. No. 4,957,787 further describes a microporous material in the form of an artificial flower, the petals of which may optionally contain a colorant. In Example 31 at column 22 of the '787 patent, a portion of biaxially stretched microporous sheet was dyed by immersion in a solution of No. 7 Rose Pink RIT® dye. The '787 patent does not disclose blue colorants.

U.S. Pat. No. 5,326,391 further describes a microporous material comprising a whiteness retaining organic surface active agent. The whiteness retaining organic surface active agent of the '391 patent is described as being either an integral component of or topically applied to the microporous material.

According to the present invention, there is provided a printable microporous material having at least one surface, said microporous material comprising:

(a) a matrix of substantially water-insoluble thermoplastic organic polymer;

(b) finely divided, substantially water-insoluble, substantially non-color producing particulate filler;

(c) a network of interconnecting pores communicating substantially throughout said microporous material; and (d) blue colorant in said matrix in an amount sufficient to improve the readability of a printed image present on at least a portion of said surface of said microporous material. The printed image may be in the form of printed indicia, printed patterns, printed designs or combinations thereof.

Other than in the operating examples, or where otherwise indicated, all numbers expressing quantities of ingredients or reaction conditions used in the specification and claims are to be understood as modified in all instances by the term "about."

DETAILED DESCRIPTION OF THE INVENTION

Microporous materials in accordance with the present invention, comprise a matrix that includes blue colorant. The blue colorant may be located substantially at the surface of the microporous material, or preferably, distributed substantially throughout the matrix. As used herein and in the claims, by "blue colorant" is meant one or more blue dyes, one or more blue pigments, or combinations of blue dyes and blue pigments.

Blue colorants that are incorporated into the matrix of the microporous material during preparation of the microporous material are, in a preferred embodiment, substantially insoluble in the organic extraction liquid(s) used in processing of the microporous material, thermally stable to the temperatures used during processing of the microporous material, and dispersible in the matrix of the microporous material. Additionally, the blue colorant used in the present invention, whether incorporated into the matrix during processing or after processing by topical application, have the properties of lightfastness, in particular when the microporous material is to be exposed to direct sunlight; chemical inertness with regard to the matrix of the microporous material; and minimal migration within the matrix after formation of the microporous material.

In one embodiment of the present invention, the blue colorant is localized substantially at the printable surface of the microporous material. In this embodiment it is preferred that the blue colorant be a blue dye, which is topically applied to the surface of the microporous material. The blue dye may be applied by any of the techniques known to those of ordinary skill in the art. For example, the printable surface of the microporous material may be immersed in a liquid solution of the blue dye for a given period of time, and optionally, at an elevated temperature. After removal from the dye solution, excess dye is typically washed from the colored surface of the microporous material. To minimize the possibility of dye leaching, blue dyes are preferably applied after the microporous material has been treated with organic extraction liquid(s), as will be described further herein.

Classes of blue dyes that may be used include, but are not limited to, blue azo dyes, blue anthraquinone dyes, blue xanthene dyes and combinations thereof. Blue anthraquinone dyes are preferred, due in part to their improved weatherablility and heat stability. The amount of blue dye(s) present in the microporous material of the present invention is variable and will depend on the tint strength of the particular blue dye employed. Generally, the blue dye is present in relatively small amounts, for example, less than 0.1 percent by weight, such as, 0.05 percent by weight, based on the total weight of the microporous material.

In a preferred embodiment of the present invention, the blue colorant is a blue pigment, which is further preferably distributed substantially throughout the matrix of the microporous material. Inorganic and/or organic blue pigments may be used. Classes of useful inorganic blue pigments include, but are not limited to, iron blues, manganese blues, ultramarine blues, cobalt blues and mixtures thereof. Classes of useful organic pigments include, but are not limited to, phthalocyanine blues, anthraquinone blues, quinacridone blues, thioindigo blues and mixtures thereof. Preferred classes of blue pigments are the phthalocyanine and ultramarine blues.

The amount of blue pigment present in the microporous materials of the present invention is variable and will depend on the tint strength of the particular blue pigment(s) selected. Generally, blue pigment is present in an amount of at least 0.05 percent by weight, preferably at least 0.10 percent by weight, and more preferably at least 0.15 percent by weight, based on the total weight of the microporous material. Blue pigment is also generally present in an amount of less than 3 percent by weight, preferably less than 2 percent by weight, and more preferably less than 1 percent by weight, based on the total weight of the microporous material. Blue pigment may be present in the microporous material of the present invention in amounts ranging between any combination of these values, inclusive of the recited values.

Generally, the amount of blue dye and/or blue pigment used with the microporous material is an amount sufficient to improve the readability of a printed image on the surface of the microporous material adapted to receive such image, as described in more detail herein.

Yellowness-blueness values, i.e., b* values, for microporous materials of the present invention, are within a range sufficient to result in improved readability of at least one of printed indicia, printed patterns and printed designs, present on at least a portion of the surface of the microporous material. The exact b* value for a given application will depend on a number of factors including, for example, aesthetic color requirements and the nature of the printing applied to the surface, e.g., a 2-D or one dimensional bar code. Photographic reproductions and 2-D bar codes can both be applied to different surface areas of a microporous substrate according to the present invention, e.g., an International Driver License. In this case, the b* value is within a range sufficient to provide both machine readability of the 2-D bar code and human recognition of the photograph.

Printable microporous substrates of the present invention typically have b* values of at least −10, preferably at least −7 and more preferably at least −5. The b* values are also typically less than −0.5, preferably less than −1, and more preferably less than −1.5. The b* values of microporous substrates according to the present invention may range between any combination of these values, inclusive of the recited values. As used herein and in the claims, b* values are Commision International L'Eclairage L* a* b* (CIELAB) yellowness-blueness values determined with illuminant C and 2° observer.

Negative (−) b* values indicate blueness, while positive (+) b* values indicate yellowness. Correspondingly, as the magnitude of negative b* values increases, blueness increases. With white substrates, an increased level of blueness is often interpreted by the human eye as being associated with an increase in whiteness or brightness of the substrate. While not intending to be bound by any theory, it is believed that the increased blueness of the microporous material of the present invention enhances the contrast between the printed image and the microporous material surface to which the printed image is applied. This increase in contrast is further believed to enhance the machine readability of the printed image. As used herein and in the claims, unless otherwise noted, by "readability" is meant machine readability, e.g., bar code readers and digital scanners.

In an embodiment of the present invention, at least a portion of the surface of the microporous material has a two-dimensional bar code printed thereon. Two-dimensional bar codes are known and are commonly used as a means of encoding data in the form of a machine readable graphic image. The encoded data in the 2-D bar code is typically decoded using a laser scanner. Two-dimensional bar code technology is described in further detail in the published literature, for example, in U.S. Pat. Nos. 5,243,655, 5,304,786, 5,393,965, 5,401,944, 5,489,158, 5,504,322, 5,541,394, 5,596,652, 5,646,389 and 5,689,101.

In preparing microporous materials of the present invention wherein blue pigments are employed, such pigments are typically predispersed in a plasticizer, processing oil or one or more organic carrier resins. It is preferred that the blue pigment be predispersed or encapsulated in resin, more preferably predispersed in thermoplastic organic resin(s). Such blue pigment predispersions are referred to herein as "blue pigment concentrates." Blue pigment concentrates serve to minimize the time and energy expended in dispersing the blue pigment throughout the microporous material of the present invention. It is preferred that the carrier resin be compatible with the components that comprise the microporous material, and not degrade its physical properties. Suitable organic carrier resins include, for example, linear low density polyethylene and high density polyethylene. It is further preferred that the blue pigment be predispersed in the carrier resin in as large an amount as is possible. Typically, blue pigment may be predispersed in the carrier resin in an amount of from 15 percent to 70 percent by weight, based on the total weight of blue pigment and carrier resin. An example of a commercially available blue pigment concentrate useful in the present invention is Pigment Blue No. 29, from M.A. HannaColor.

The matrix of the microporous material consists essentially of substantially water-insoluble thermoplastic organic polymer. The numbers and kinds of such polymers suitable for use as the matrix are large. In general, any substantially water-insoluble thermoplastic organic polymer which can be extruded, calendered, pressed, or rolled into film, sheet, strip, or web may be used. The polymer may be a single polymer or it may be a mixture of polymers. The polymers may be homopolymers, copolymers, random copolymers, block copolymers, graft copolymers, atactic polymers, isotactic polymers, syndiotactic polymers, linear polymers, or branched polymers. When mixtures of polymers are used, the mixture may be homogeneous or it may comprise two or more polymeric phases.

Examples of classes of suitable substantially water-insoluble thermoplastic organic polymers include the thermoplastic polyolefins, poly(halo-substituted olefins), polyesters, polyamides, polyurethanes, polyureas, poly(vinyl halides), poly(vinylidene halides), polystyrenes, poly(vinyl esters), polycarbonates, polyethers, polysulfides, polyimides, polysilanes, polysiloxanes, polycaprolactones, polyacrylates, and polymethacrylates. Hybrid classes, for example, thermoplastic poly(urethane-ureas), poly(ester-amides), poly(silane-siloxanes), and poly(ether-esters) are within contemplation. Examples of suitable substantially water-insoluble thermoplastic organic polymers include thermoplastic high density polyethylene, low density polyethylene, ultrahigh molecular weight polyethylene, polypropylene (atactic, isotactic, or syndiotactic), poly(vinyl chloride), polytetrafluoroethylene, copolymers of ethylene and acrylic acid, copolymers of ethylene and methacrylic acid, poly(vinylidene chloride), copolymers of vinylidene chloride and vinyl acetate, copolymers of vinylidene chloride and vinyl chloride, copolymers of ethylene and propylene, copolymers of ethylene and butene, poly(vinyl acetate), polystyrene, poly(omega-aminoundecanoic acid) poly(hexamethylene adipamide), poly(epsilon-caprolactam), and poly(methyl methacrylate). These listings are by no means exhaustive, but are intended for purposes of illustration.

Preferred substantially water-insoluble thermoplastic organic polymers comprise poly(vinyl chloride), copolymers of vinyl chloride, or mixtures thereof; or they comprise essentially linear ultrahigh molecular weight polyolefin, which is essentially linear ultrahigh molecular weight polyethylene having an intrinsic viscosity of at least 10 deciliters/gram, essentially linear ultrahigh molecular weight polypropylene having an intrinsic viscosity of at least 6 deciliters/gram, or a mixture thereof. Essentially linear ultrahigh molecular weight polyethylene having an intrinsic viscosity of at least 18 deciliters/gram is especially preferred.

As ultrahigh molecular-weight (UHMW) polyolefin is not a thermoset polymer having an infinite molecular weight, it is technically classified as a thermoplastic polymer. However, because the molecules are essentially very long chains, UHMW polyolefin, and especially UHMW polyethylene, softens when heated but does not flow as a molten liquid in a typical thermoplastic manner. The very long chains and the unique properties they provide to UHMW polyolefin are believed to contribute in large measure to the desirable properties of microporous materials made using this polymer.

As indicated previously herein, the intrinsic viscosity of the UHMW polyethylene is at least 10 deciliters/gram. Usually the intrinsic viscosity is at least 14 deciliters/gram. Often the intrinsic viscosity is at least 18 deciliters/gram. In many cases the intrinsic viscosity is at least 19 deciliters/gram. Although there is no particular restriction on the upper limit of the intrinsic viscosity, the intrinsic viscosity is frequently in the range of from 10 to 39 deciliters/gram. The intrinsic viscosity is often in the range of from 14 to 39 deciliters/gram. In most cases the intrinsic viscosity is in the range of from 18 to 39 deciliters/gram. An intrinsic viscosity in the range of from 18 to 32 deciliters/gram is preferred.

Also as indicated previously herein the intrinsic viscosity of the UHMW polypropylene is at least 6 deciliters/gram. In many cases the intrinsic viscosity is at least 7 deciliters/gram. Although there is no particular restriction on the upper limit of the intrinsic viscosity, the intrinsic viscosity is often in the range of from 6 to 18 deciliters/gram. An intrinsic viscosity in the range of from 7 to 16 deciliters/gram is preferred.

As used herein and in the claims, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of American Standard Test Method (ASTM) D 4020-81, except that several dilute solutions of differing concentration are employed.

The nominal molecular weight of UHMW polyethylene (UHMWPE) is empirically related to the intrinsic viscosity of the polymer according to the equation:

$$M(UHMWPE)=5.37\times10^{4}[\eta]^{1.37}$$

where M(UHMWPE) is the nominal molecular weight and [η] is the intrinsic viscosity of the UHMW polyethylene expressed in deciliters/gram. Similarly, the nominal molecular weight of UHMW polypropylene (UHMWPP) is empirically related to the intrinsic viscosity of the polymer according to the equation:

$$M(UHMWPP)=8.88\times10^{4}[\eta]^{1.25}$$

where M(UHMWPP) is the nominal molecular weight and [η] is the intrinsic viscosity of the UHMW polypropylene expressed in deciliters/gram.

The essentially linear ultrahigh molecular weight polypropylene is most frequently essentially linear ultrahigh molecular weight isotactic polypropylene. Often the degree of isotacticity of such polymer is at least 95 percent, while preferably it is at least 98 percent.

When used, sufficient UHMW polyolefin should be present in the matrix to provide its properties to the microporous material. Other thermoplastic organic polymer may also be present in the matrix so long as its presence does not materially affect the properties of the microporous material in an adverse manner. The amount of the other thermoplastic polymer which may be present depends upon the nature of such polymer. In general, a greater amount of other thermoplastic organic polymer may be used if the molecular structure contains little branching, few long side chains, and few bulky side groups, than when there is a large amount of branching, many long side chains, or many bulky side groups. For this reason, the preferred thermoplastic organic polymers which may optionally be present are low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers may be neutralized with sodium, zinc, or the like.

It is our experience that usually at least one percent UHMW polyolefin, based on the weight of the matrix, will provide the desired properties to the microporous material. At least 3 percent UHMW polyolefin by weight of the matrix is commonly used. In many cases at least 10 percent by weight of the matrix is UHMW polyolefin. Frequently at least 50 percent by weight of the matrix is UHMW polyolefin. In many instances at least 60 percent by weight of the matrix is UHMW polyolefin. Sometimes at least 70 percent by weight of the matrix is UHMW polyolefin. In some cases the other thermoplastic organic polymer is substantially absent.

In a preferred embodiment, the matrix comprises a mixture of substantially linear ultrahigh molecular weight polyethylene having an intrinsic viscosity of at least 10 deciliters/gram and lower molecular weight polyethylene having an ASTM D 1238-86 Condition E melt index of less than 50 grams/10 minutes and an ASTM D 1238-86 Condition F melt index of at least 0.1 gram/10 minutes. The nominal molecular weight of the lower molecular weight polyethylene (LMWPE) is lower than that of the UHMW polyethylene. LMWPE is thermoplastic and many different types are known. One method of classification is by density, expressed in grams/cubic centimeter and rounded to the nearest thousandth, in accordance with ASTM D 1248-84 (re-approved 1989), as summarized in the following Table:

TABLE 1

| Type | Abbreviation | Density, g/cm$^3$ |
|---|---|---|
| Low Density Polyethylene | LDPE | 0.910–0.925 |
| Medium Density Polyethylene | MDPE | 0.926–0.940 |
| High Density Polyethylene | HDPE | 0.941–0.965 |

Any or all of these polyethylenes may be used as the LMWPE in the present invention. However, HDPE is preferred because it ordinarily tends to be more linear than MDPE or LDPE.

The ASTM D 1238-86 Condition E (i.e., 190° C. and 2.16 kilogram load) melt index of the LMWPE is less than 50 grams/10 minutes. Often the Condition E melt index is less than 25 grams/10 minutes. Preferably the Condition E melt index is less than 15 grams/10 minutes.

The ASTM D 1238-86 Condition F (i.e., 190° C. and 21.6 kilogram load) melt index of the LMWPE is at least 0.1 gram/10 minutes. In many cases the Condition F melt index is at least 0.5 grams/10 minutes. Preferably the Condition F melt index is at least 1.0 grams/10 minutes.

It is especially preferred that the UHMW polyethylene constitute at least one percent by weight of the matrix and that the UHMW polyethylene and the LMWPE together constitute substantially 100 percent by weight of the polymer of the matrix. In an embodiment of the present invention, the LMWPE is preferably high density polyethylene.

The finely divided, substantially water-insoluble, substantially non-color producing particulate filler of the microporous material of the present invention may comprise siliceous and/or non-siliceous particles. As used herein and in the claims, by "substantially non-color producing" is meant the particulate filler does not provide a significant hue, i.e., red through violet, to the microporous material, and does not interfere with or detract from the improved readability provided by the presence of the blue colorant. Typically, the particulate filler has light scattering characteristics and as a result enhances the opacity of the microporous material. Correspondingly, the microporous material, in the absence of the blue colorant, is preferably white, e.g., off-white to bright white, in appearance.

A preferred particulate filler is finely divided substantially water-insoluble siliceous particles. As present in the microporous material, the siliceous particles may be in the form of ultimate particles, aggregates of ultimate particles, or a combination of both. In most cases, at least 90 percent by weight of the siliceous particles used in preparing the microporous material have gross particle sizes in the range of from 5 to 40 micrometers as determined by use of a Model TAII Coulter counter (Coulter Electronics, Inc.) according to ASTM C 690-80 but modified by stirring the filler for 10 minutes in Isoton II electrolyte (Curtin Matheson Scientific, Inc.) using a four-blade, 4.445 centimeter diameter propeller stirrer. Preferably, at least 90 percent by weight of the siliceous particles have gross particle sizes in the range of from 10 to 30 micrometers. It is expected that the sizes of siliceous agglomerates may be reduced during processing of the ingredients to prepare the microporous material. Accordingly, the distribution of gross particle sizes in the microporous material may be smaller than in the raw siliceous filler itself.

Examples of suitable siliceous particles include particles of silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. Silica and the clays are the preferred siliceous particles. Of the silicas, precipitated silica, silica gel, or fumed silica is most often used.

As recited previously herein, the particulate filler may comprise non-siliceous particles. Examples of non-siliceous filler particles include particles of titanium oxide, zinc oxide, antimony oxide, zirconia, magnesia, alumina, zinc sulfide, barium sulfate, strontium sulfate, calcium carbonate, magnesium carbonate, magnesium hydroxide, and finely divided substantially water-insoluble flame retardant filler particles such as particles of ethylenebis(tetra-bromophthalimide), octabromodiphenyl oxide, decabromodiphenyl oxide, and ethylenebisdibromonorbornane dicarboximide.

As present in the microporous material, the finely divided substantially water-insoluble non-siliceous filler particles may be in the form of ultimate particles, aggregates of ultimate particles, or a combination of both. In most cases, at least 75 percent by weight of the non-siliceous filler particles used in preparing the microporous material have gross particle sizes in the range of from 0.1 to 40 micrometers as determined by use of a Micromeretics Sedigraph 5000-D (Micromeretics Instrument Corp.) in accordance with the accompanying operating manual. The preferred ranges vary from filler to filler. For example, it is preferred that at least 75 percent by weight of antimony oxide particles be in the range of from 0.1 to 3 micrometers, whereas it is preferred that at least 75 percent by weight of barium sulfate particles be in the range of from 1 to 25 micrometers. It is expected that the sizes of filler agglomerates may be reduced during processing of the ingredients to prepare the microporous material. Therefore, the distribution of gross particle sizes in the microporous material may be smaller than in the raw non-siliceous filler itself.

Particularly preferred finely divided substantially water-insoluble siliceous filler particles are precipitated silica. Precipitated silicas are known, and are described in further detail in U.S. Pat. No. 5,326,391 at column 7, lines 12 through 65, which disclosure in incorporated herein by reference.

Many different precipitated silicas may be employed in the present invention, but the preferred precipitated silicas are those obtained by precipitation from an aqueous solution of sodium silicate using a suitable acid such as sulfuric acid, hydrochloric acid, or carbon dioxide. Such precipitated silicas are themselves known and typical processes for producing them are described in detail in U.S. Pat. Nos. 2,657,149; 2,940,830; 4,681,750 and 5,094,829.

In the case of precipitated silica, the preferred filler, the average ultimate particle size (irrespective of whether or not the ultimate particles are agglomerated) is less than 0.1 micrometer as determined by transmission electron microscopy. Often the average ultimate particle size is less than 0.05 micrometer. Preferably the average ultimate particle size of the precipitated silica is less than 0.03 micrometer.

The surface area of useful siliceous filler particles is typically in the range of from 20 to 400 square meters per gram as determined by the Brunaurer, Emmet, Teller (BET) method according to ASTM C 819-77 using nitrogen as the adsorbate but modified by outgassing the system and the sample for one hour at 130° C. Preferably the surface area is in the range of from 25 to 350 square meters per gram. Preferably, but not necessarily, the surface area of any non-siliceous filler particles used is also in at least one of these ranges.

It is desirable to essentially retain the filler in the microporous material. Accordingly, it is preferred that the substantially water-insoluble filler particles be substantially insoluble in the processing plasticizer and substantially insoluble in the organic extraction liquid when microporous material is produced by the process as described further herein.

The finely divided substantially water-insoluble filler particles typically constitute at least 40 percent by weight, preferably at least 50 percent by weight, and more preferably at least 60 percent by weight of the microporous material. The filler particles also typically constitute less than 90 percent by weight, preferably less than 85 percent by weight, and more preferably less than 90 percent by weight of the microporous material. The amount of finely divided substantially water-insoluble filler particles present in the microporous material of the present invention may range between any combination of these values, inclusive of the recited values.

At least 50 percent by weight of the finely divided substantially water-insoluble filler particles are preferably finely divided substantially water-insoluble siliceous filler particles. In many cases at least 65 percent by weight of the finely divided substantially water-insoluble filler particles are siliceous. Often at least 75 percent by weight of the finely divided substantially water-insoluble filler particles are siliceous. Frequently at least 85 percent by weight of the finely divided substantially water-insoluble filler particles are siliceous. In many instances all of the finely divided substantially water-insoluble filler particles are siliceous.

Minor amounts, usually less than 5 percent by weight, of other materials used in processing such as lubricant, processing plasticizer, organic extraction liquid, water, and the like, may optionally also be present. Yet other materials introduced for particular purposes may optionally be present in the microporous material in small amounts, usually less than 15 percent by weight. Examples of such materials include antioxidants, ultraviolet light absorbers, reinforcing fibers such as chopped glass fiber strand, and the like. The balance of the microporous material, exclusive of filler and any coating, printing ink, or impregnant applied for one or more special purposes is essentially the thermoplastic organic polymer.

The microporous material of the present invention, also comprises a network of interconnecting pores, which communicate substantially throughout the material. On a coating-free, printing ink free and impregnant-free basis, pores typically constitute from 35 to 95 percent by volume of the microporous material when made by the processes as further described herein. In many cases the pores constitute from 60 to 75 percent by volume of the microporous material. As used herein and in the claims, the porosity (also known as void volume) of the microporous material, expressed as percent by volume, is determined according to the equation:

$$\text{Porosity}=100[1-d_1/d_2]$$

where $d_1$ is the density of the sample, which is determined from the sample weight and the sample volume as ascertained from measurements of the sample dimensions and $d_2$ is the density of the solid portion of the sample, which is determined from the sample weight and the volume of the solid portion of the sample. The volume of the solid portion of the microporous material is determined using a Quantachrome stereopycnometer (Quantachrome Corp.) in accordance with the operating manual accompanying the instrument.

The volume average diameter of the pores of the microporous material is determined by mercury porosimetry using an Autoscan mercury porosimeter (Quantachrome Corp.) in accordance with the operating manual accompanying the instrument. The volume average pore radius for a single scan is automatically determined by the porosimeter. In operating the porosimeter, a scan is made in the high pressure range (from 138 kilopascals absolute to 227 megapascals absolute). If 2 percent or less of the total intruded volume occurs at the low end (from 138 to 250 kilopascals absolute) of the high pressure range, the volume average pore diameter is taken as twice the volume average pore radius determined by the porosimeter. Otherwise, an additional scan is made in the low pressure range (from 7 to 165 kilopascals absolute) and the volume average pore diameter is calculated according to the equation:

$$d=2\left[\frac{v_1r_1}{w_1}+\frac{v_2r_2}{w_2}\right]*\left[\frac{v_1}{w_1}+\frac{v_2}{w_2}\right]^{(-1)}$$

where d is the volume average pore diameter; $v_1$ is the total volume of mercury intruded in the high pressure range; $v_2$ is the total volume of mercury intruded in the low pressure range; $r_1$ is the volume average pore radius determined from the high pressure scan; $r_2$ is the volume average pore radius determined from the low pressure scan; $w_1$ is the weight of the sample subjected to the high pressure scan; and $w_2$ is the weight of the sample subjected to the low pressure scan.

Generally on a coating-free, printing ink-free and impregnant-free basis the volume average diameter of the pores is at least 0.02 micrometers, preferably at least 0.04 micrometers, and more preferably at least 0.05 micrometers. On the same basis, the volume average diameter of the pores is also typically less than 0.5 micrometers, preferably less than 0.3 micrometers, and more preferably less than 0.25 micrometers. The volume average diameter of the pores, on this basis, may range between any of these values, inclusive of the recited values.

In the course of determining the volume average pore diameter by the above procedure, the maximum pore radius detected is sometimes noted. This is taken from the low pressure range scan if run; otherwise it is taken from the high pressure range scan. The maximum pore diameter is twice the maximum pore radius.

Coating, printing and impregnation processes can result in filling at least some of the pores of the microporous material. In addition, such processes may also irreversibly compress the microporous material. Accordingly, the parameters with respect to porosity, volume average diameter of the pores, and maximum pore diameter are determined for the microporous material prior to application of one or more of these processes.

As is known to those of ordinary skill in the art, many processes are available for producing the microporous materials which may be employed in the present invention. For example, the microporous material of the present invention can be prepared by mixing together filler particles, blue colorant, preferably blue pigment concentrate as discussed previously herein, thermoplastic organic polymer powder, processing plasticizer and minor amounts of lubricant and antioxidant until a substantially uniform mixture is obtained.

The weight ratio of filler to polymer powder employed in forming the mixture is essentially the same as that of the microporous material to be produced. The mixture, together with additional processing plasticizer, is introduced to the heated barrel of a screw extruder. Attached to the extruder is a sheeting die. A continuous sheet formed by the die is forwarded without drawing to a pair of heated calender rolls acting cooperatively to form continuous sheet of lesser thickness than the continuous sheet exiting from the die.

The continuous sheet from the calender is then passed to a first extraction zone where the processing plasticizer is substantially removed by extraction with an organic liquid, which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet, which is microporous material, is passed to a take-up roll.

The processing plasticizer is a liquid at room temperature and usually is a processing oil such as paraffinic oil, naphthenic oil, or aromatic oil. Suitable processing oils include those meeting the requirements of ASTM D 2226-82, Types 103 and 104. Preferred are oils which have a pour point of less than 220° C. according to ASTM D 97-66 (re-approved 1978). Processing plasticizers useful in preparing the microporous material of the present invention are discussed in further detail in U.S. Pat. No. 5,326,391 at column 10, lines 26 through 50, which disclosure is incorporated herein by reference.

There are many organic extraction liquids that can be used to prepare the microporous material of the present invention, a preferred example of which is 1,1,2-trichloroethylene. Examples of other suitable organic extraction liquids include those described in U.S. Pat. No. 5,326,391 at column 10, lines 51 through 57, which disclosure is incorporated herein by reference.

In the above described process for producing microporous material, extrusion and calendering are facilitated when the substantially water-insoluble filler particles carry much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics.

The residual processing plasticizer content of microporous material according to the present invention is usually less than 10 percent by weight of the microporous sheet and this may be reduced even further by additional extractions using the same or a different organic extraction liquid. Often the residual processing plasticizer content is less than 5 percent by weight of the microporous sheet and this may be reduced even further by additional extractions.

On a coating-free, printing ink free and impregnant-free basis, pores constitute from 35 to 85 percent by volume of the microporous material when made by the above-described process. In many cases the pores constitute from 60 to 75 percent by volume of the microporous material.

The volume average diameter of the pores of the microporous material when made by the above-described process, is usually at least 0.02 micrometers, preferably at least 0.04 micrometers, and more preferably at least 0.05 micrometers on a coating-free, printing ink-free and impregnant-free basis. Also, the volume average diameter of the pores on the same basis is usually less than 0.5 micrometers, preferably less than 0.3 micrometers, and more preferably less than 0.25 micrometers. The volume average diameter of the pores may range between any of these values, inclusive of the recited values.

The microporous material of the present invention may also be produced according to the general principles and procedures of U.S. Pat. Nos. 2,772,322; 3,696,061; and/or 3,862,030 These principles and procedures are particularly applicable where the polymer of the matrix is or is predominately poly(vinyl chloride) or a copolymer containing a large proportion of polymerized vinyl chloride.

Microporous materials produced by the above-described processes may optionally be stretched. It will be appreciated that stretching both increases the void volume of the material and induces regions of molecular orientation. As is well known in the art, many of the physical properties of molecularly oriented thermoplastic organic polymer, including tensile strength, tensile modulus, Young's modulus, and others, differ considerably from those of the corresponding thermoplastic organic polymer having little or no molecular orientation. Stretching is preferably accomplished after substantial removal of the processing plasticizer as described above.

Various types of stretching apparatus and processes are well known to those of ordinary skill in the art, and may be used to accomplish stretching of the microporous material of the present invention. Stretching of the microporous materials is described in further detail in U.S. Pat. No. 5,326,391 at column 11, line 45 through column 13, line 13, which disclosure is incorporated herein by reference.

In all cases, the porosity of the stretched microporous material is, unless coated, printed or impregnated after stretching, greater than that of the unstretched microporous material. On a coating-free, printing ink-free and impregnant-free basis, pores usually constitute at least 80 percent by volume of the stretched microporous material. In many instances the pores constitute at least 85 percent by volume of the stretched microporous material. Often the pores constitute from more than 80 percent to 95 percent by volume of the stretched microporous material. From 85 percent to 95 percent by volume is preferred.

Generally on a coating-free, printing ink-free and impregnant-free basis the volume average diameter of the pores of the stretched microporous material is at least 0.6 micrometers, preferably at least 1 micrometer, and more preferably at least 2 micrometers. Also, on the same basis, the volume average diameter of the pores of the stretched microporous material is less than 50 micrometers, preferably less than 40 micrometers, and more preferably less than 30 micrometers. The volume average diameter of the pores of the stretched microporous material of the present invention may range between any of these values, inclusive of the recited values.

The microporous material of the present invention may optionally be coated, impregnated, and/or printed with a wide variety of coating compositions, impregnating compositions, and/or printing inks using a wide variety of coating, impregnating, and/or printing processes. The coating compositions, coating processes, impregnating compositions, impregnation processes, printing inks, and printing processes are themselves conventional. The printing, impregnation, and coating of microporous material are more fully described in U.S. Pat. Nos. 4,861,644; 5,032,450; 5,047,283; and 5,605,750.

The present invention is more particularly described in the examples that follow, which are intended to be illustrative only, since numerous modifications and variations therein will be apparent to those skilled in the art. Unless otherwise specified, all parts and percentages are by weight.

EXAMPLES

Samples of microporous material in the form of roll stock were prepared by mixing together the ingredients in the proportions as listed in Table 2. Letters shown in parentheses refer to footnotes, which appear at the end of Table 2. Example 1 is a comparative example (no blue colorant added), and Example 2 is an example of a microporous material according to the present invention. The results of color analysis of Examples 1 and 2 are summarized in Table 3.

Polymer, silica, antioxidant, blue pigment concentrate, titanium dioxide and lubricant in the amounts specified in Table 2 were placed in a high intensity mixer and mixed at high speed for 6 minutes. The processing oil needed to formulate the batch was pumped into the mixer over a period of from 3 to 5 minutes with high speed agitation. After completion of the processing oil addition, the high intensity mixer was operated for an additional 6 minutes to complete the distribution of the processing oil uniformly throughout the mixture.

The mixture was conveyed from the high intensity mixer to a feeder hopper and introduced into the feed port of a twin screw extruder by means of a variable rate screw feeder. Additional processing oil was added via a metering pump, which injected the oil downstream of the feed port in a relatively low pressure region of the extruder. The formulation was melted, mixed and extruded through a slot die having a slot width of 196 centimeters and a slot thickness adjustable in the range of from 0.15 centimeters to 0.30 centimeters.

The extruded sheet was then calendered. A description of one type of calender that may be used, including structures of devices and modes of operation, may be found in U.S. Pat. No. 4,734,229. Other calenders of different design may alternatively be used, such calenders and their modes of operation are well known in the art. The hot, calendered sheet was then passed around a chill roll to cool the sheet. The rough edges of the cooled calendered sheet were trimmed by rotary knives to the desired width.

The oil filled sheet was conveyed to an extractor unit where it was contacted by both liquid and vaporized 1,1,2-trichloroethylene (TCE). The sheet was transported over a series of rollers in a serpentine fashion to provide multiple, sequential vapor/liquid/vapor contacts. The extraction liquid in the sump was maintained at a temperature of from 65 to 88° C. Overflow from the sump of the TCE extractor was returned to a still which recovered the TCE and the processing oil for reuse in the process. The bulk of the TCE was extracted from the sheet by steam as the sheet was passed through a second extractor unit. A description of these types of first and second extractors may be found in U.S. Pat. No. 4,648,417, including especially the structures of the devices and their modes of operation.

The sheet was dried by radiant heat and convective air flow in a drying oven. The dried sheet was wound on cores to provide roll stock for further evaluation and testing. Samples taken from the microporous roll stock were analyzed using a calorimeter.

TABLE 2

| | Example No. | |
|---|---|---|
| Ingredients | 1 | 2 |
| UHMWPE (a) | 127 | 127 |
| HDPE (b) | 130 | 130 |
| Silica (c) | 500 | 500 |
| Blue Pigment Concentrate (d) | 0 | 16 |
| Antioxidant (e) | 3 | 3 |
| Lubricant (f) | 6 | 6 |
| $TiO_2$ (h) | 23 | 23 |
| Process oil added to mixer (i) | 790 | 790 |
| Process oil added to extruder (i) | 321 | 321 |

(a) GUR ® 4130 Ultra High Molecular Weight Polyethylene (UHMWPE), obtained commercially from Ticona Corp.
(b) Fina ® 1288 High Density Polyethylene (HDPE), obtained commercially from Fina Corp.
(c) Hi-Sil ® SBG precipitated silica, obtained commercially from PPG Industries, Inc.
(d) A 20 percent by weight concentrate of ultramarine blue pigment in Fina ® 1288 HDPE, obtained commercially from M. A. HannaColor.
(e) Hi-Sil ® SBG precipitated silica (from PPG Industries, Inc.) having sorbed thereon 56 percent by weight, based on total weight, of Rhonotec ® 201 antioxidant (from Hoffman LaRouche, Inc.). The parts shown are the total parts of silica and antioxidant.
(f) Synpro ® calcium stearate lubricant, obtained commercially from Polymer Additives Division, Ferro Corp.
(h) Tipure ® R-103 titanium dioxide, obtained commercially form E. I. du Pont de Nemours and Company.
(i) Tufflo ® 6065 process oil, obtained commercially from Lyondell Petroleum Corp., parts oil added at the indicated point in the process.

TABLE 3

| Colorimeter | Example No. | |
|---|---|---|
| Data (j) | 1 | 2 |
| L* (k) | 97.10 ± 0.12 | 92.45 ± 0.08 |
| a* (1) | 0.59 ± 0.04 | −1.48 ± 0.03 |
| b* (m) | 2.61 ± 0.04 | −4.39 ± 0.13 |

(j) Colorimeter data were determined under the CIELAB system using an X-Rite ® X-948 Spectrocolorimeter (manufactured by X-Rite, Inc. of Grandville, Michigan, USA) with illumenant C and 2° observer settings. The data shown are the average ± standard deviation calculated from ten readings taken from the smooth side of the top sheet of a stack of 4 sheets of the corresponding microporous material. Each microporous sheet had a thickness of about 10 mils (0.254 millimeters), and the stack of 4 sheets had a total thickness of about 40 mils (1.016 millimeters).
(k) Lightness values, for which values of greater magnitude indicate increased lightness.
(l) Redness-greenness values, for which positive (+) values indicate redness and negative (−) values indicate greenness.
(m) Yellowness-blueness values, for which positive (+) values indicate yellowness and negative (−) values indicate blueness.

The data of Table 3 show that microporous materials according to the present invention, as represented by Example 2, have b* values that are more negative, i.e., bluer, than those of comparative Example 1. In addition, microporous materials corresponding to Example 2 have been reported to have improved 2-D bar code readability relative to materials corresponding to comparative Example 1.

The present invention has been described with reference to specific details of particular embodiments thereof. It is not intended that such details be regarded as limitations upon the scope of the invention except insofar as and to the extent that they are included in the accompanying claims.

We claim:

1. In a printable microporous material having at least one printable surface, said microporous material comprising:

(a) a matrix of substantially water-insoluble thermoplastic organic polymer comprising essentially linear ultrahigh molecular weight polyolefin;

(b) finely divided, substantially water-insoluble, substantially non-color producing particulate filler comprising at least 50 percent by weight of siliceous particles, said filler being distributed throughout said matrix and constituting from 40 to 90 percent by weight, based on the total weight of said microporous material; and (c) a network of interconnecting pores communicating substantially throughout said microporous material;

the improvement wherein said matrix includes blue colorant present in an amount sufficient to improve the readability of a printed image present on at least a portion of said printable surface of said microporous material.

2. The microporous material of claim 1 wherein said blue colorant is a blue pigment.

3. The microporous material of claim 2 wherein said blue pigment is selected from the group consisting of phthalocyanine blues, anthraquinone blues, quinacridone blues, thioindigo blues, ultramarine blues and mixtures thereof.

4. The microporous material of claim 3 wherein said blue pigment is selected from phthalocyanine blues, ultramarine blues and mixtures thereof.

5. The microporous material of claim 4 wherein said blue pigment is present in an amount of from 0.05 percent to 3 percent by weight, based on the total weight of said microporous material.

6. The microporous material of claim 1 wherein said microporous material has a b* value of from −10 to −0.5.

7. The microporous material of claim 1 wherein said essentially linear ultrahigh molecular weight polyolefin comprises essentially linear ultrahigh molecular weight polyethylene having an intrinsic viscosity of at least 10 deciliters/gram, essentially linear ultrahigh molecular weight polypropylene having an intrinsic viscosity of at least 6 deciliters/gram, or a mixture thereof.

8. The microporous material of claim 7 wherein said essentially linear ultrahigh molecular weight polyolefin is essentially linear ultrahigh molecular weight polyethylene having an intrinsic viscosity of at least 18 deciliters/gram.

9. The microporous material of claim 8 wherein said linear ultrahigh molecular weight polyethylene has an intrinsic viscosity in the range of from 18 to 39 deciliters/gram.

10. The microporous material of claim 1 wherein said matrix comprises a mixture of substantially linear ultrahigh molecular weight polyethylene having an intrinsic viscosity of at least 10 deciliters/gram and lower molecular weight polyethylene having an ASTM D 1238-86 Condition E melt index of less than 50 grams/10 minutes and an ASTM D 1238-86 Condition F melt index of at least 0.1 grams/10 minutes.

11. The microporous material of claim 10 wherein said substantially linear ultrahigh molecular weight polyethylene constitutes at least one percent by weight of said matrix and said substantially linear ultrahigh molecular weight polyethylene and said lower molecular weight polyethylene together constitute substantially 100 percent by weight of the polymer of the matrix.

12. The microporous material of claim 11 wherein said lower molecular weight polyethylene is high density polyethylene.

13. The microporous material of claim 1 wherein said particulate filler constitutes from 40 to 85 percent by weight of said microporous material, based on the total weight of said microporous material.

14. The microporous material of claim 13 wherein said siliceous particles are particulate silica.

15. The microporous material of claim 14 wherein said particulate silica is particulate precipitated silica.

16. The microporous material of claim 1 wherein said pores constitute from 35 to 95 percent by volume of said microporous material, based on the total volume of said microporous material.

17. In a printable microporous material having at least one printable surface, said microporous material comprising:

(a) a matrix of substantially water-insoluble thermoplastic organic polymer comprising a mixture of substantially linear ultrahigh molecular weight polyethylene having an intrinsic viscosity of at least 10 deciliters/gram, and lower molecular weight polyethylene having an ASTM D 1238-86 Condition E melt index of less than 50 grams/10 minutes and an ASTM D 1238-86 Condition F melt index of at least 0.1 grams/10 minutes, said substantially linear ultrahigh molecular weight polyethylene constituting at least one percent by weight of said matrix, and said substantially linear ultrahigh molecular weight polyethylene and said lower molecular weight polyethylene together constituting substantially 100 percent by weight of the polymer of the matrix;

(b) finely divided, substantially water-insoluble, substantially non-color producing particulate filler, of which at least 50 percent by weight is siliceous particles, said filler being distributed throughout said matrix and constituting from 40 to 90 percent by weight of said microporous material based on the total weight of said microporous material; and (c) a network of interconnecting pores communicating substantially throughout said microporous material, said pores constituting from 35 to 95 percent by volume of said microporous material, based on the total volume of said microporous material;

the improvement wherein said matrix includes blue colorant present in an amount sufficient to improve the readability of a printed image present on at least a portion of said printable surface of said microporous material.

18. The microporous material of claim 17 wherein said blue colorant is a blue pigment selected from the group consisting of phthalocyanine blues, anthraquinone blues, quinacridone blues, thioindigo blues, ultramarine blues and mixtures thereof, said blue pigment being present in said matrix in an amount of from 0.05 percent to 3 percent by weight, based on the total weight of said microporous material.

19. The microporous material of claim 18 wherein said microporous material has a b* value of from −10 to −0.5.

20. The microporous material of claim 19 wherein said lower molecular weight polyethylene is high density polyethylene.

21. The microporous material of claim 20 wherein said particulate filler is particulate precipitated silica and constitutes from 40 to 85 percent by weight of said microporous material, based on the total weight of said microporous material.

22. The microporous material of claim 17 further comprising having printing on at least a portion of said printable surface in the form of at least one of indicia, patterns and designs.

23. The microporous material of claim 22 wherein said printing is in the form of a two-dimensional bar code pattern.

* * * * *